United States Patent [19]
Satonaka

[11] Patent Number: 5,938,714
[45] Date of Patent: Aug. 17, 1999

[54] DISTANCE CONTROL APPARATUS HAVING A DISTANCE CONTROL START/STOP DETERMINATION DEVICE

[75] Inventor: Hisashi Satonaka, Susono, Japan

[73] Assignee: Toyota Jidosha Kabushiki Kaisha, Japan

[21] Appl. No.: 08/986,726

[22] Filed: Dec. 8, 1997

[30] Foreign Application Priority Data

Dec. 25, 1996 [JP] Japan .................................... 8-346003

[51] Int. Cl.$^6$ .................................................. B60K 31/04
[52] U.S. Cl. ............................ 701/96; 701/93; 701/301; 340/435; 340/903; 180/169
[58] Field of Search ......................... 701/96, 93, 300, 701/301, 205, 78; 340/902, 903, 943, 435, 436; 342/47, 70, 71, 458; 180/169

[56] References Cited

U.S. PATENT DOCUMENTS

| | | | |
|---|---|---|---|
| 4,621,705 | 11/1986 | Etoh ........................................ | 180/169 |
| 4,622,636 | 11/1986 | Tachibana ................................ | 701/96 |
| 5,014,200 | 5/1991 | Chundrlik et al. ........................ | 701/96 |
| 5,165,497 | 11/1992 | Chi ........................................... | 180/169 |
| 5,396,426 | 3/1995 | Hibino et al. ............................. | 701/96 |
| 5,400,864 | 3/1995 | Winner et al. ............................ | 180/169 |
| 5,529,139 | 6/1996 | Kurahashi et al. ....................... | 340/903 |
| 5,629,669 | 5/1997 | Asano et al. ............................. | 340/436 |

FOREIGN PATENT DOCUMENTS 60-131327  7/1985  Japan .

*Primary Examiner*—Tan Nguyen
*Attorney, Agent, or Firm*—Finnegan, Henderson, Farabow, Garrett & Dunner, L.L.P.

[57] ABSTRACT

A distance control apparatus includes a distance detecting device which detects a distance between a vehicle and a preceding vehicle. A vehicle speed control device controls the distance between the vehicle and the preceding vehicle by adjusting a speed of the vehicle based on the detected distance, so that the vehicle is kept away from the preceding vehicle at a target distance. A distance control start/stop determination device determines one of execution and cancellation of the control of the distance by the vehicle speed control device in response to an operating condition of the vehicle.

12 Claims, 8 Drawing Sheets

DISTANCE CONTROL APPARATUS HAVING A DISTANCE CONTROL START/STOP DETERMINATION DEVICE

BACKGROUND OF THE INVENTION (1) Field of the Invention

The present invention relates to a distance control apparatus for an automotive vehicle in which a distance between the vehicle and a preceding vehicle is controlled by adjusting a vehicle speed using a throttle adjusting actuator and a brake actuator, so that the vehicle is kept away from the preceding vehicle at a controlled distance when the vehicle is operating in an automatic speed control mode.

(2) Description of the Related Art

As disclosed in Japanese Laid-Open Patent Application No. 60-131327, there is known a distance control apparatus of an automotive vehicle in which a distance between the vehicle and a preceding vehicle is controlled by detecting the distance and controlling a speed of the vehicle through adjustment of a throttle opening angle of a throttle valve in the vehicle.

Hereinafter, for the sake of convenience of description, a vehicle including a distance control apparatus will be referred to as the vehicle, and a preceding vehicle will be referred to as the target, and a distance between the vehicle and a preceding vehicle will be referred to as a following distance.

In the apparatus of the above-mentioned publication, a following distance between the vehicle and the target is detected by using a distance detecting device, and a speed of the vehicle is detected by using a vehicle speed sensor. A safe distance appropriate for the speed of the vehicle is calculated. A speed of the target is calculated from the following distance and the speed of the vehicle. When the distance from the vehicle to the target changes and exceeds a given distance, a vehicle speed holding signal is supplied for a given time period so that the speed of the vehicle is retained by the vehicle speed holding signal. A ratio of change of the speed of the vehicle needed for changing the following distance to the safe distance is calculated, and a following distance control is performed by controlling the speed of the vehicle in conformity with the ratio of change of the vehicle speed by adjusting the throttle opening angle of the throttle valve.

In the above-described apparatus, if the speed of the target when the vehicle speed hold signal is supplied or after the vehicle speed hold signal has been supplied, is high and a difference in speed between the vehicle and the target exceeds a reference value, the speed of the vehicle is controlled by adjusting the throttle opening angle such that the vehicle is operating at a previous vehicle speed prior to the start of the following distance control.

In the above-described apparatus, the following distance control is automatically stopped or canceled when the conditions related to the vehicle and the target are satisfied, and it is automatically started when the conditions are not satisfied. Therefore, if the conditions are abruptly satisfied or unsatisfied under certain circumstances, the operating condition of the vehicle is abruptly shifted or changed due to the start/stop of the following distance control, and a sudden change in the behavior of the vehicle is given to the vehicle operator. This causes the riding comfort of the vehicle to be degraded. The above-described apparatus is likely to give a sudden change in the behavior of the vehicle to the vehicle operator under certain circumstances.

For example, if the target is concealed by another vehicle from a detectable range of the vehicle when the target is running at a low speed (e.g. 10 km/h) and the vehicle is being decelerated from a high speed (e.g. 50 km/h) in order to keep the vehicle away from the target at a controlled distance by execution of the following distance control, the detection of the distance between the vehicle and the target abruptly becomes impossible. In this case, the following distance control is forcefully terminated by the failure of the detection, and the speed of the vehicle is quickly changed back to the previous high speed due to cancellation of the following distance control. In the above-described apparatus, a sudden change in the behavior of the vehicle is given to the vehicle operator.

Further, there is another case in which the vehicle abruptly approaches the target from a long distance and the target is running at a relatively low speed. In this case, when the following distance becomes less than the given distance, the following distance control is automatically started to reduce the speed of the vehicle. However, if a difference in speed between the vehicle and the target is excessively large, the vehicle is abruptly decelerated by starting the following distance control. In the above-described apparatus, a sudden change in the behavior of the vehicle is given to the vehicle operator.

SUMMARY OF THE INVENTION

An object of the present invention is to provide an improved distance control apparatus in which the above-described problems are eliminated.

Another object of the present invention is to provide a distance control apparatus which is capable of determining one of execution and cancellation of the following distance control in response to an operating condition of the vehicle, thereby preventing the operating condition of the vehicle from being abruptly changed when the following distance control is started or stopped.

The above-mentioned objects of the present invention are achieved by a distance control apparatus which comprises: a distance detecting device which detects a distance between a vehicle and a preceding vehicle; a vehicle speed control device which controls the distance between the vehicle and the preceding vehicle by adjusting a speed of the vehicle based on the detected distance, in order to keep the vehicle away from the preceding vehicle at a target distance; and a distance control start/stop determination device which determines one of execution and cancellation of the control of the distance by the vehicle speed control device in response to an operating condition of the vehicle.

In the distance control apparatus of the present invention, the control of the distance by the vehicle speed control device is executed or canceled by the distance control start/stop determination device in response to an operating condition of the vehicle. It is possible for the distance control apparatus of the present invention to effectively prevent the operating condition of the vehicle from being abruptly shifted or changed due to the start/stop of the control of the distance. The distance control apparatus of the present invention is effective in providing riding comfort to the vehicle operator when the vehicle is operating in an automatic speed control mode.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
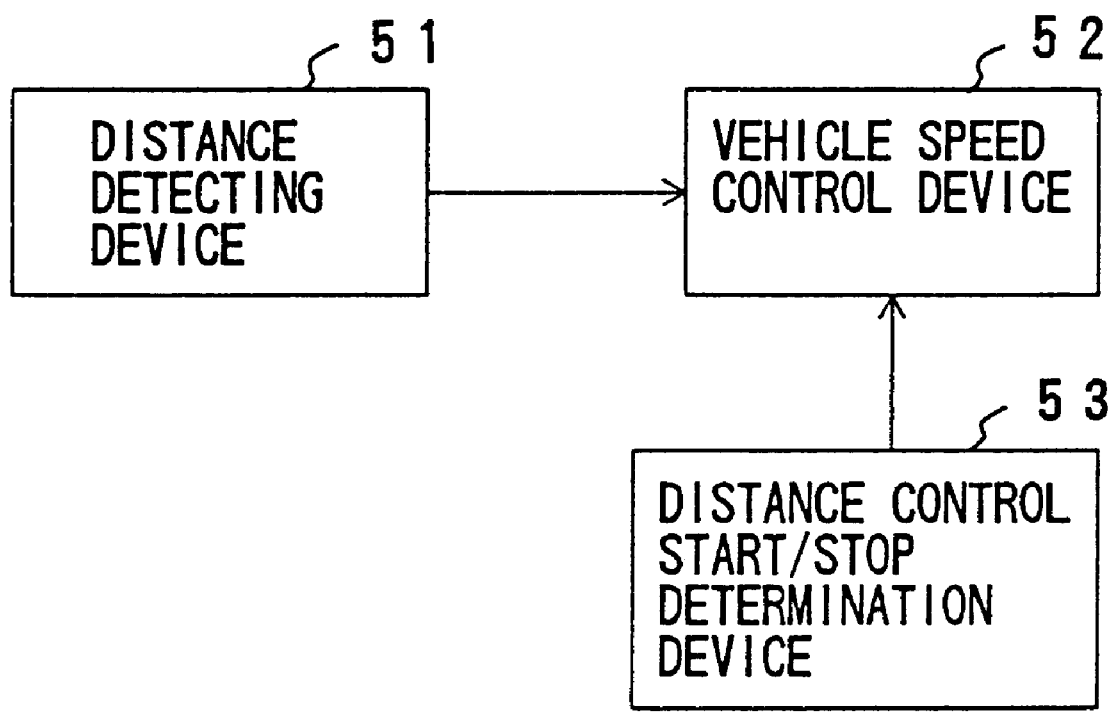
FIG. 1 is a diagram for explaining the basic concept of the present invention.

FIG. 1 shows the basic concept of the present invention.

As shown in FIG. 1, a distance control apparatus of the present invention includes a distance detecting device 51, a vehicle speed control device 52, and a distance control start/stop determination device 53.

The distance detecting device 51 detects a distance between the vehicle and a preceding vehicle, which will be described later.

The vehicle speed control device 52 controls the distance between the vehicle and the preceding vehicle by adjusting vehicle speed based on the detected distance from the distance detecting device 51, in order to keep the vehicle away from the preceding vehicle at a target distance. The vehicle speed control according to the present invention will be described later in detail. Hereinafter, the control of the distance by the vehicle speed control device 52 will be called a following distance control.

The distance control start/stop determination device 53 determines whether the control of the distance by the vehicle speed control device 52 should be executed or canceled, in response to an operating condition of the vehicle. The distance control start/stop determination according to the present invention will be described later in detail.

In the distance control apparatus of the present invention, the following distance control by the vehicle speed control device 52 is executed or canceled by the distance control start/stop determination device 53 in response to an operating condition of the vehicle. It is possible for the distance control apparatus of the present invention to effectively prevent the operating condition of the vehicle from being abruptly shifted or changed due to the start/stop of the following distance control. The distance control apparatus of the present invention is effective in providing riding comfort to the vehicle operator when the vehicle is operating in an automatic speed control mode.

Figure 2:
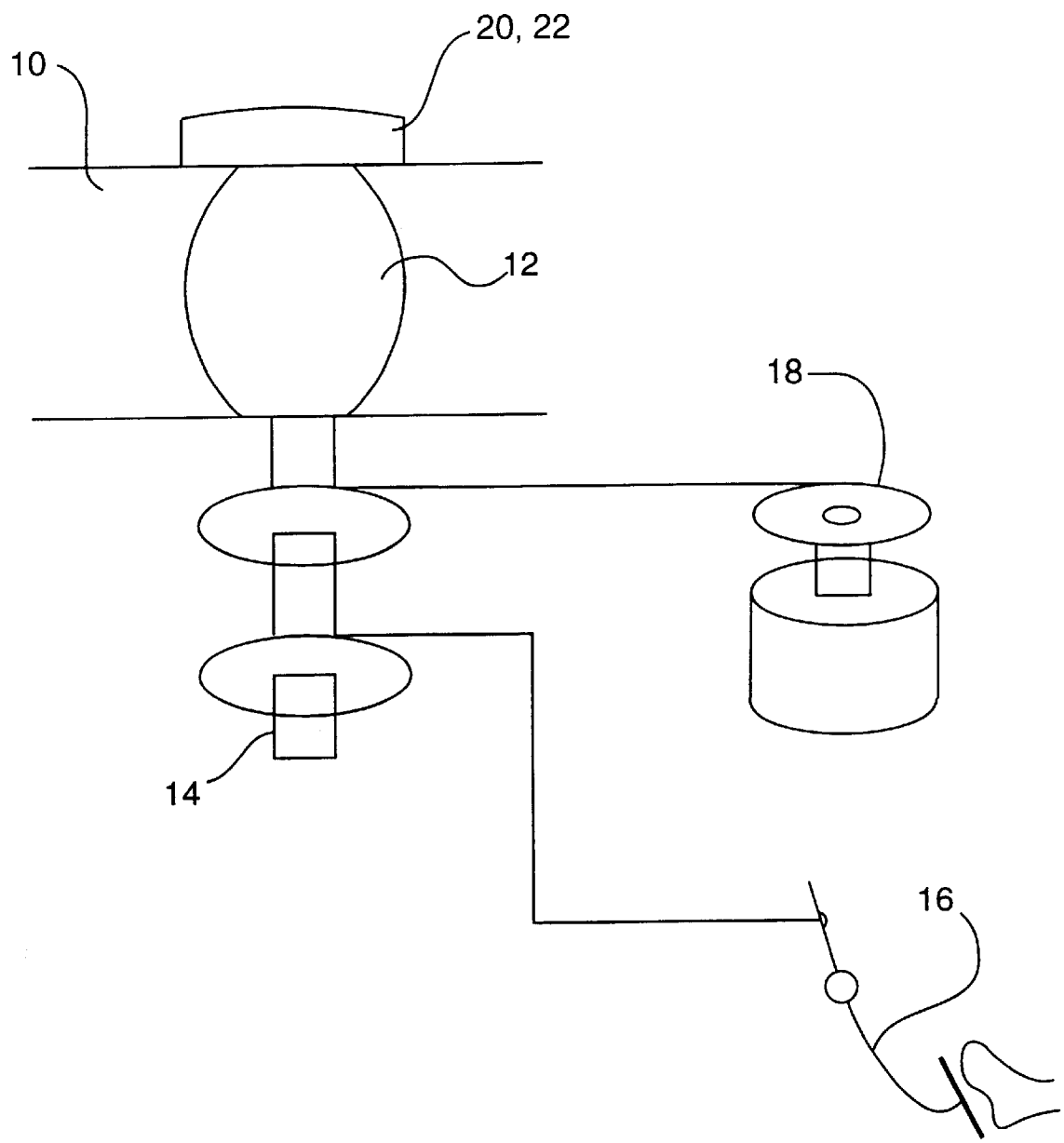
FIG. 2 is a diagram of a throttle adjusting actuator provided in an automotive vehicle to which one embodiment of the present invention is applied.

FIG. 2 shows a throttle adjusting actuator 18 provided in an automotive vehicle to which one embodiment of the present invention is applied.

Referring to FIG. 2, a throttle valve 12 is provided in an intake pipe 10 of an internal combustion engine (not shown), and a rotating shaft 14 is connected to the throttle valve 12 so that the throttle valve 12 can be rotated around the rotating shaft 14. The rotating shaft 14 is connected to both an accelerator pedal 16 and the throttle adjusting actuator 18. A throttle opening angle of the throttle valve 12 in the intake pipe 10 is varied by rotation of the rotating shaft 14 by the accelerator pedal 16 and/or by the throttle adjusting actuator 18. A sectional area of an intake passage in which air is passed through the throttle valve 12 and directed to the engine is varied in accordance with the rotation of the rotating shaft 14.

When the accelerator pedal 16 is depressed by a vehicle operator, the rotating shaft 14 is rotated by movement of the accelerator pedal 16 and the throttle opening angle of the throttle valve 12 is increased by the rotation of the rotating shaft 14. On the other hand, when the throttle adjusting actuator 18 is driven by a control unit, the rotating shaft 14 is rotated by a function of the throttle adjusting actuator 18 and the throttle opening angle of the throttle valve 12 is automatically adjusted by the rotation of the rotating shaft 14. That is, the throttle opening angle of the throttle valve 12 is adjusted (decreased or increased) by using the throttle adjusting actuator 18.

The throttle adjusting actuator 18 functions to adjust the throttle opening angle of the throttle valve 12 to be greater than a preset throttle opening angle θ1 previously set by depressing the accelerator pedal 16. However, the throttle adjusting actuator 18 does not function to adjust the throttle opening angle of the throttle valve 12 to be smaller than the preset throttle opening angle θ1.

As shown in FIG. 2, a throttle position sensor 20 and an idle switch 22 are attached to the throttle valve 12 in the vehicle. The throttle position sensor 20 senses a throttle opening angle of the throttle valve 12 from a rotating angle of the rotating shaft 14, and outputs a signal indicating the throttle opening angle of the throttle valve 12. The idle switch 22 detects an ON/OFF state of the throttle valve 12 from the rotating angle of the rotating shaft 14. When the throttle valve 12 is set at an idle position (or in an OFF state), the throttle opening angle of the throttle valve 12 is equal to zero. The idle switch 22 outputs a signal indicating the ON/OFF state of the throttle valve 12, that is, indicating whether the throttle valve 12 has been set at the idle position.

Figure 3:
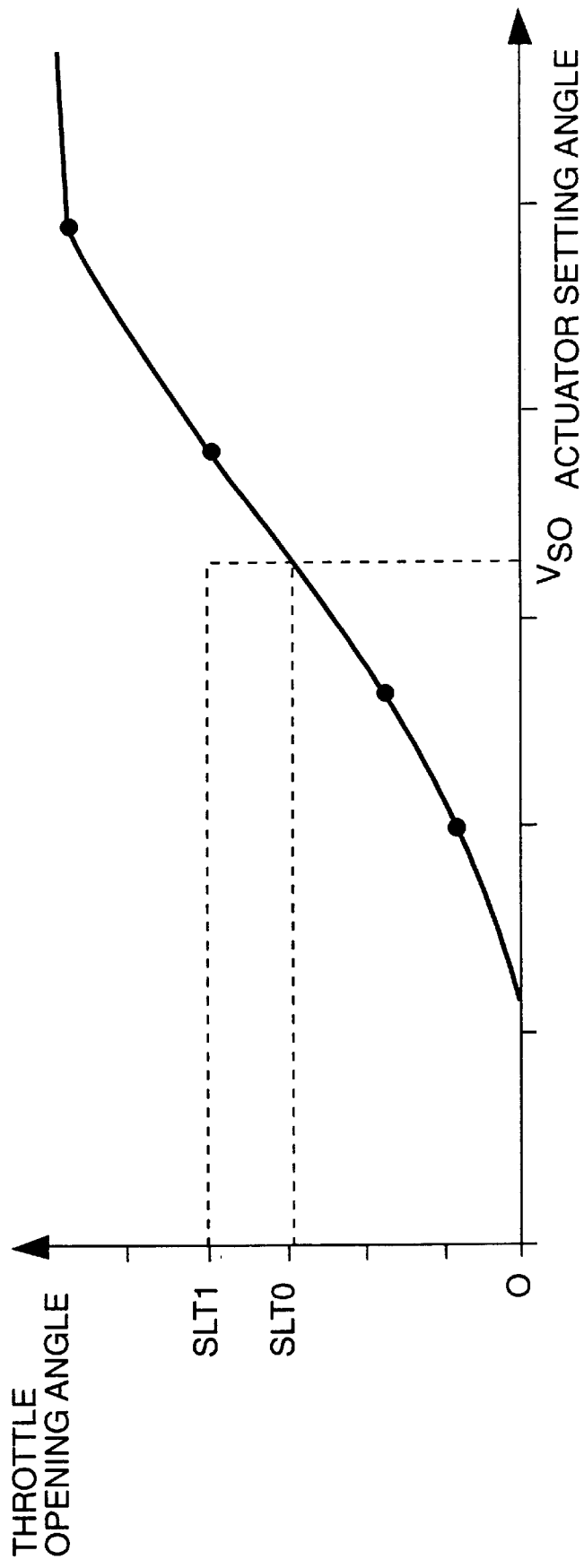
FIG. 3 is a graph of a characteristic curve between an actuator setting angle and a throttle opening angle for the throttle adjusting actuator.

FIG. 3 shows a characteristic curve between an actuator setting angle and a throttle opening angle, which is used when the throttle valve 12 is adjusted by the throttle adjusting actuator 18.

When the throttle adjusting actuator 18 is driven by an actuator setting angle "$V_{so}$", the throttle opening angle of the throttle valve 12 is adjusted by the throttle adjusting actuator 18 such that the throttle opening angle of the throttle valve 12 changes to a throttle opening angle "SLT0" responsive to the actuator setting angle "$V_{so}$" in conformity with the characteristic curve of FIG. 3.

If the accelerator pedal 16 is depressed by the vehicle operator during control of the throttle valve 12 by the throttle adjusting actuator 18, the throttle opening angle of the throttle valve 12 is further increased from the throttle opening angle "SLT0" to a throttle opening angle "SLT1" which is located above the characteristic curve of FIG. 3 for the actuator setting angle "$V_{so}$".

In the present embodiment of the distance control apparatus, a map prepared in conformity with the characteristic curve of FIG. 3 is stored in a memory of a control system (which will be described later). When an actuator setting angle of the throttle adjusting actuator 18 is detected by the control system and the accelerator pedal 16 is not depressed by the vehicle operator during the control of the throttle valve 12 by the throttle adjusting actuator 18, it is possible for the control system to determine an estimated throttle opening angle of the throttle valve 12 from the detected actuator setting angle by utilizing the map.

Figure 4:
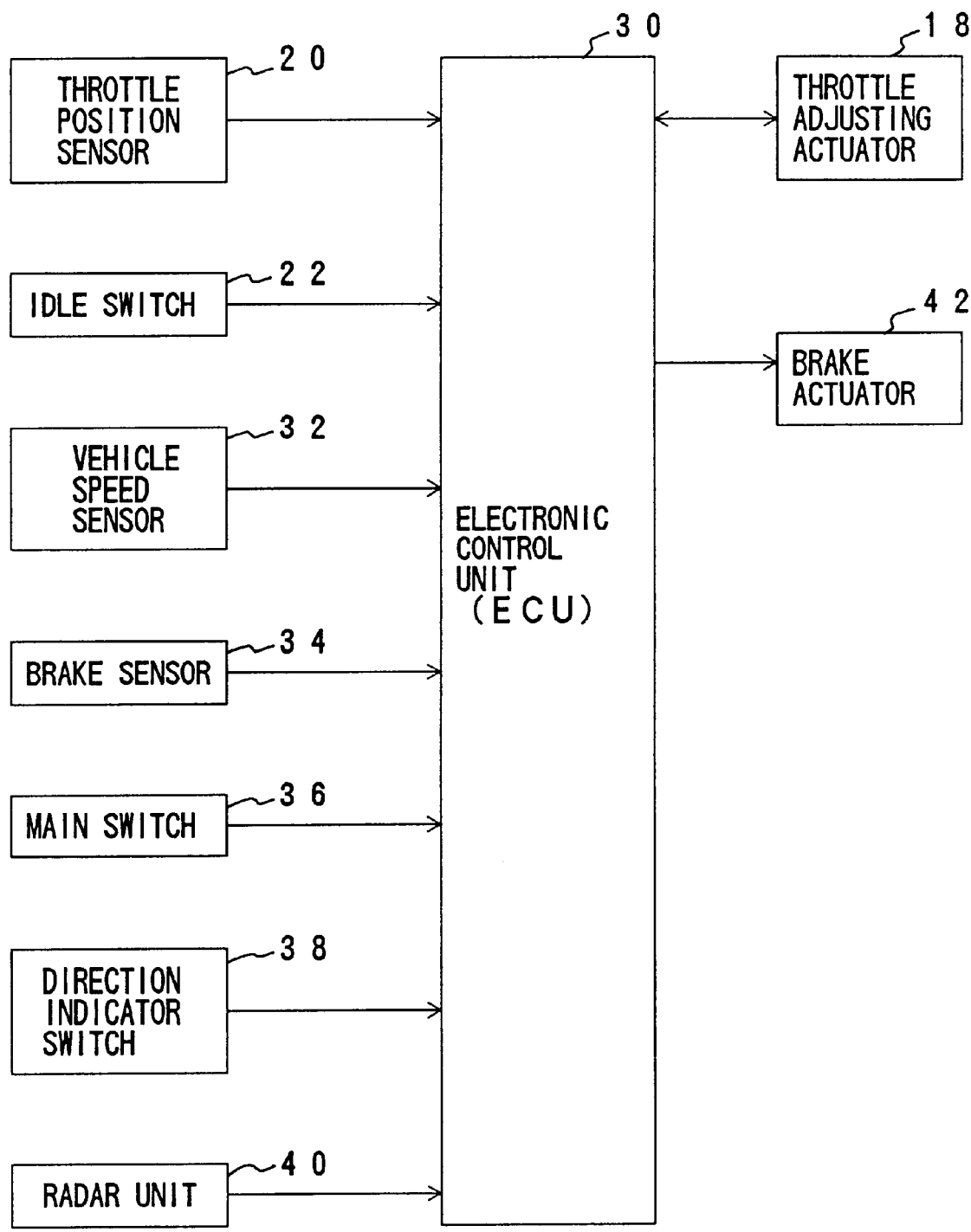
FIG. 4 is a diagram of a control system provided in an automotive vehicle to which one embodiment of the present invention is applied.

FIG. 4 shows a control system provided in the automotive vehicle to which one embodiment of the present invention is applied.

Referring to FIG. 4, an electronic control unit (ECU) 30 is provided in the vehicle in order to provide the distance control apparatus of the present invention.

The throttle position sensor 20 and the idle switch 22 are connected to the ECU 30. A signal output from the throttle position sensor 20 and an ON/OFF signal output from the idle switch 22 are input to the ECU 30. The ECU 30 detects a throttle opening angle of the throttle valve 12 based on the signal from the throttle position sensor 20. The ECU 30 detects whether the throttle valve 12 has been set at the idle position (or whether the throttle opening angle has been set to zero) based on the ON/OFF signal from the idle switch 22.

Further, as shown in FIG. 4, a vehicle speed sensor 32, a brake sensor 34, a main switch 36, a direction indicator switch 38 and a radar unit 40, which are provided in the vehicle, are connected to the ECU 30.

The vehicle speed sensor 32 outputs a signal indicating a speed of the vehicle. The ECU 30 detects the speed of the vehicle based on the signal from the vehicle speed sensor 32. The brake sensor 34 outputs an ON/OFF signal indicating whether a brake pedal (not shown) of the vehicle has been depressed by the vehicle operator. The ECU 30 detects whether the brake pedal has been depressed by the vehicle operator based on the ON/OFF signal from the brake sensor 34.

The main switch 36 outputs an ON/OFF signal indicating whether an automatic speed control mode has been set by the vehicle operator. When the automatic speed control mode is set by the vehicle operator, the ECU 30 starts performing an automatic speed control procedure (which will be described later). The ECU 30 detects whether or not the automatic speed control mode has been set by the vehicle operator, based on the ON/OFF signal from the main switch 36.

The direction indicator switch 38 outputs an ON/OFF signal indicating whether a direction indicator lever (not shown) of the vehicle has been set by the vehicle operator. The ECU 30 detects whether the direction indicator lever has been set by the vehicle operator based on the ON/OFF signal from the direction indicator switch 38.

The radar unit 40 outputs, to the ECU 30, a distance signal indicating a following distance between the vehicle and a target (or a preceding vehicle) and a speed signal indicating a relative velocity of the vehicle to the target. The ECU 30 detects the following distance between the vehicle and the target and the relative velocity of the vehicle to the target based on the distance signal and the speed signal output from the radar unit 40.

Further, as shown in FIG. 4, the throttle adjusting actuator 18 is connected to the ECU 30, and a brake actuator 42 is connected to the ECU 30. The throttle adjusting actuator 18 outputs to the ECU 30 a signal indicating an actuator setting angle at which the throttle adjusting actuator 18 is currently set, and the ECU 30 detects an actuator setting angle of the throttle adjusting actuator 18 based on the signal output from the throttle adjusting actuator 18. The throttle adjusting actuator 18 and the ECU 30 serve to adjust the throttle opening angle of the throttle valve 12 so as to increase or decrease the vehicle speed. The brake actuator 42 is provided at each wheel of the vehicle. The brake actuator 42 and the ECU 30 serve to exert a braking force on the wheels of the vehicle to decelerate the vehicle.

In the present embodiment of the control system, the ECU 30 carries out the control of the throttle adjusting actuator 18 along with the control of the brake actuator 42 based on the signals output from the above-mentioned sensors and switches, which will be described later.

Figure 5:
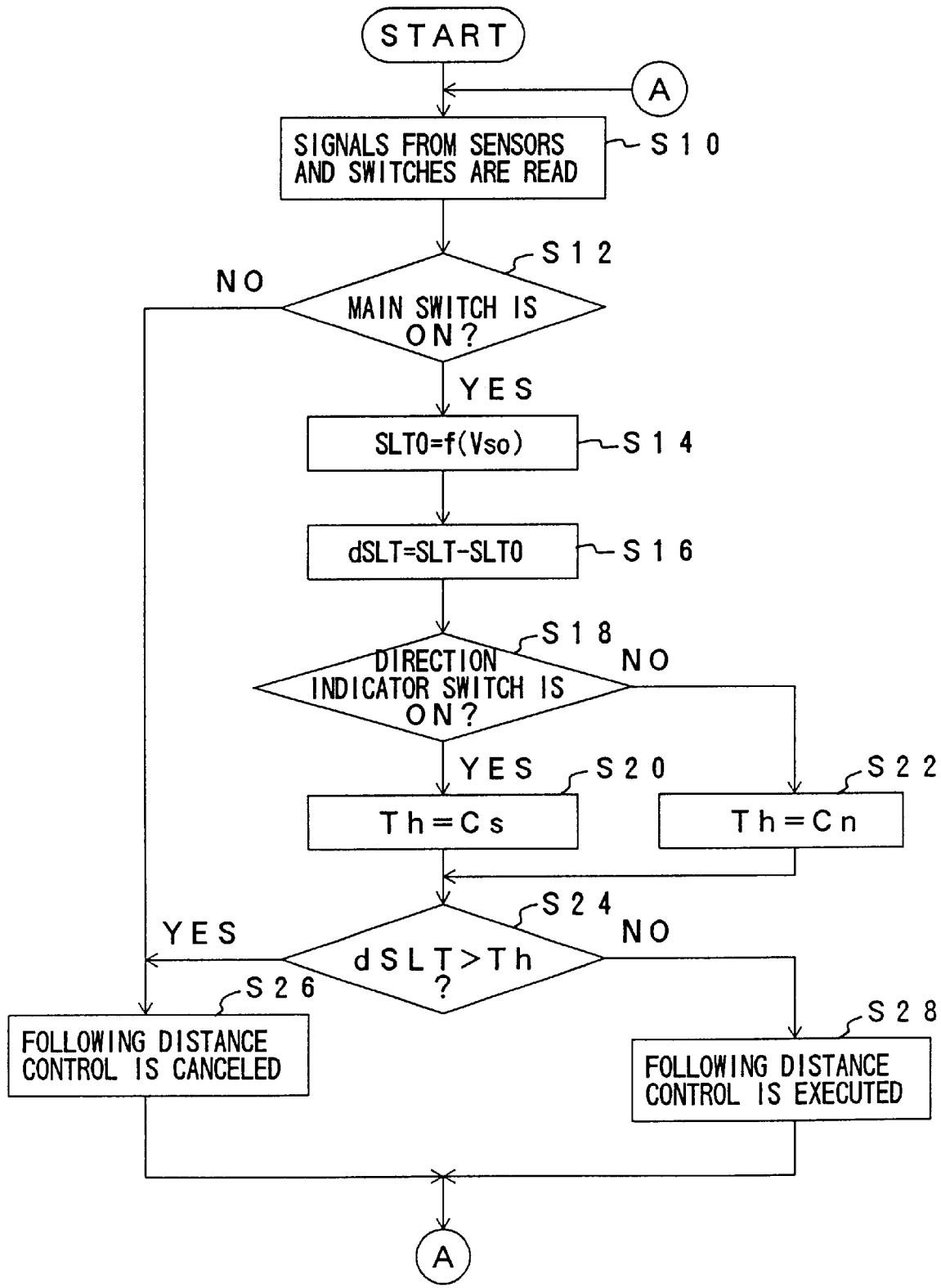
FIG. 5 is a flowchart for explaining an automatic speed control procedure executed by the control system according to the present invention.

FIG. 5 shows an automatic speed control procedure executed by the control system according to the present invention. In the present embodiment, the ECU 30 executes the automatic speed control procedure of FIG. 5.

When the automatic speed control procedure of FIG. 5 is started, the ECU 30 at step S10 reads the signals output from the throttle adjusting actuator 18, the throttle position sensor 20, the idle switch 22, the vehicle speed sensor 32, the brake sensor 34, the main switch 36, the direction indicator switch 38, and the radar unit 40.

After the step S10 is performed, step S12 detects whether the main switch 36 is in an ON state. In the ECU 30, if an OFF state of the main switch 36 is previously stored in a memory of the ECU 30, the OFF state of the main switch 36 is switched to the ON state by an ON signal output by the main switch 36 when it has been set by the vehicle operator. If the ON state of the main switch 36 is previously stored in the memory, the ON state of the main switch 36 is switched to the OFF state by an OFF signal output by the main switch 36 when it has been reset by the vehicle operator.

When the ECU 30 is powered on, the OFF state of the main switch 36 is initially stored in the memory of the ECU 30. Further, in the ECU 30, each time the OFF state of the main switch 36 is switched to the ON state, a flag "CONT.FLG", a flag "GFLG" and a flag "GFLGO", which will be described later, are all reset to zero.

When the result at the step S12 is negative (the main switch 36 is in the OFF state), step S26 is executed by the ECU 30. Step S26 cancels the following distance control. After the step S26 is performed, the above step S10 is performed again.

When the result at the step S12 is affirmative (the main switch 36 is in the ON state), step S14 is executed by the ECU 30. Step S14 determines an estimated throttle opening angle "$SLT_0$" of the throttle valve 12 from the detected actuator setting angle "$V_{so}$" by utilizing the map prepared in conformity with the characteristic curve of FIG. 3 ($SLT_0 = f(V_{so})$).

After the step S14 is performed, step S16 determines a difference "dSLT" between the detected throttle opening angle "SLT" from the throttle position sensor 20 and the estimated throttle opening angle "$SLT_0$" obtained at the step S14 ($dSLT = SLT - SLT_0$).

If the accelerator pedal 16 is not depressed by the vehicle operator during the automatic speed control procedure, the difference "dSLT" is equal to zero. However, if the accelerator pedal 16 is depressed to accelerate the vehicle during the automatic speed control procedure, the detected throttle opening angle "SLT" is greater than the estimated throttle opening angle "$SLT_0$", and the difference "dSLT" is greater than zero.

After the step S16 is performed, step S18 detects whether the direction indicator switch 38 is in an ON state. When the result at the step S18 is affirmative (the direction indicator switch 38 is ON), step S20 sets a threshold level "Th" at a relatively small value "Cs" (Th=Cs). In this case, it is determined that the vehicle is about to change from the current lane to a passing lane, and it is possible to make the condition for canceling the following distance control less severe by setting the threshold level "Th" at the small value "Cs".

On the other hand, when the result at the step S18 is negative (the direction indicator switch 38 is OFF), step S22 sets the threshold level "Th" at a normal value "Cl" (Th=Cl). In this case, it is determined that the vehicle is operating in a straight line path, and the condition for canceling the following distance control is set at a normal level by using the normal value "Cl". The normal value "Cl" is greater than the value "Cs".

After either the step S20 or the step S22 is performed, step S24 detects whether the difference "dSLT" between the detected throttle opening angle "SLT" and the estimated throttle opening angle "$SLT_0$" is greater than the threshold level "Th".

When dSLT>Th, the step S26 is performed to cancel the following distance control, and then the step S10 is performed again. On the other hand, when dSLT≦Th, step S28 is performed to execute the following distance control, and then the step S10 is performed again.

Figure 6:
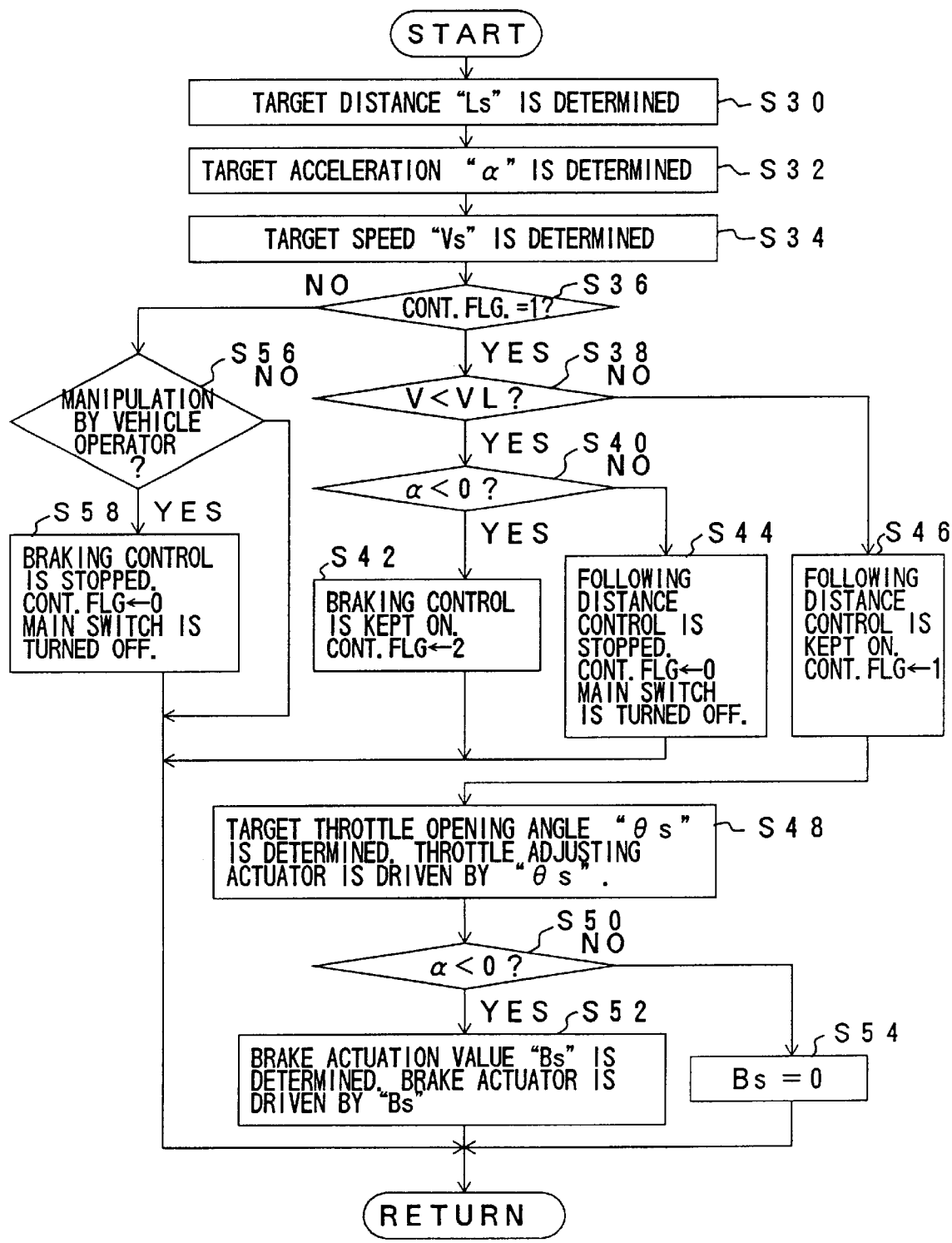
FIG. 6 is a flowchart for explaining a first embodiment of a following distance control routine executed in the automatic speed control procedure.

Next, FIG. 6 shows a first embodiment of a following distance control routine executed in the automatic speed control procedure of FIG. 5. The following distance control routine of FIG. 6 is executed by the ECU 30 at the step S28 shown in FIG. 5.

When the following distance control routine of FIG. 6 is started, the ECU 30 at step S30 determines a target distance "Ls" with respect to the vehicle. The target distance "Ls" is obtained by multiplication of a detected vehicle speed "V" (output from the vehicle speed sensor 32) and a preset time (e.g. 2 seconds). For example, the target distance "Ls" is determined to be 55 m (meters) when "V"=100 km/h (kilometers per hour).

After the step S30 is performed, step S32 determines a target acceleration "α" with respect to the vehicle. The target acceleration "α" is determined from a distance difference Dl and a relative velocity Vr by utilizing a two-dimensional map in which the target acceleration "α" is defined as a function using the parameters Dl and Vr. The distance difference Dl is determined by subtracting the target distance "Ls" from a following distance L detected based on the distance signal output from the radar unit 40 (or Dl=L−Ls). The relative velocity Vr is detected based on the speed signal output from the radar unit 40. In the two-dimensional map, the target acceleration "α" is equal to zero when Dl=0 and Vr=0. When the parameter Vr is fixed at a constant value, the greater the distance difference Dl is, the greater the target acceleration α is. When the parameter Dl is fixed at a constant value, the greater the relative velocity Vr is, the greater the target acceleration α is.

After the step S32 is performed, step S34 determines a target speed "Vs" with respect to the vehicle. The target speed "Vs" is determined by taking the integral of the target acceleration "α".

After the step S34, step S36 detects whether a control flag "CONT.FLG" is equal to 1. In the present embodiment, the control flag "CONT.FLG" is set at "1" at a previous cycle when it is determined that the following distance control should be executed or the execution should be kept on. The control flag "CONT.FLG" is set at "2" at a previous cycle when it is determined that the braking control to decelerate the vehicle should be executed or the execution should be kept on. The control flag "CONT.FLG" is set at "0" at a previous cycle when it is determined that the following distance control should be canceled.

When the result at the step S36 is affirmative ("CONT.FLG"="1"), step S38 is performed by the ECU 30. Step S38 detects whether the detected vehicle speed "V" from the vehicle speed sensor 32 is lower than a given reference speed "VL" (e.g. 40 km/h). The step S38 is performed in order to make a determination as to whether the following distance control is being executed at the present cycle.

When the result at the step S38 is affirmative (V<VL), step S40 detects whether the target acceleration "α" is smaller than 0. The step S40 is performed in order to make a determination as to whether the braking control to decelerate the vehicle should be executed.

When the result at the step S40 is affirmative (α<0), it is determined that the braking control should be kept on to decelerate the vehicle. Step S42 continues to perform the braking control to decelerate the vehicle, and sets the control flag "CONT.FLG" at 2 ("CONT.FLG"←2). The adjustment of the throttle opening angle of the throttle valve 12 by using the throttle adjusting actuator 18 remains stopped. After the step S42 is executed, the following distance control routine ends.

Accordingly, in the distance control apparatus of the present embodiment, when the vehicle is decelerated to a speed lower than the reference speed VL during the following distance control, the braking control is kept on to decelerate the vehicle. The control of the vehicle speed by adjusting the throttle opening angle is not executed. Further, even when the detection of the following distance between the vehicle and the target (or the detection of the target) abruptly becomes impossible during the following distance control, it is possible for the distance control apparatus of the present embodiment to prevent the operating condition of the vehicle from being abruptly shifted or changed due to the stop of the following distance control.

In the above-described embodiment, the step S42 is performed to keep on the braking control to decelerate the vehicle. Alternatively, the step S42 may be performed to inhibit the target acceleration of the vehicle by adjusting the throttle opening angle. The same advantages can be provided by such an alternative.

On the other hand, when the result at the step S40 is negative (α≧0), it is determined that the following distance control should be stopped and the braking control should not be executed. Step S44 stops the following distance control, sets the control flag "CONT.FLG" at 0 ("CONT.FLG"←0), and turns the main switch 36 OFF. After the step S44 is executed, the following distance control routine ends.

When the result at the step S38 is negative (V≧VL), it is determined that the following distance control should be kept on. Step S46 continues to perform the following distance control, and sets the control flag "CONT.FLG" at 1 ("CONT.FLG"←1).

After the step S46 is executed, step S48 determines a target throttle opening angle $\theta_s$ in accordance with the following equation:

$$\theta_s = K1 \cdot Vs + K2 \cdot (Vr - V)$$

where K1 and K2 are predetermined coefficients, Vs is the target speed, Vr is the relative velocity from the radar unit 40, and V is the detected vehicle speed from the vehicle speed sensor 32.

Further, step S48 drives the throttle adjusting actuator 18 such that the throttle opening angle of the throttle valve 12 is adjusted to the target throttle opening angle $\theta_s$ by the throttle adjusting actuator 18.

After the step S48 is performed, step S50 detects whether the target acceleration "α" is smaller than 0. The step S50 is performed in order to make a determination as to whether the braking control should be executed to decelerate the vehicle.

When the result at the step S50 is affirmative (α<0), it is determined that the braking control should be executed to decelerate the vehicle. Step S52 determines a brake actuation value "Bs" from the target acceleration "α", and drives the brake actuator 42 such that the braking force according to the brake actuation value "Bs" is exerted on the vehicle wheels by the brake actuator 42. The brake actuation value "Bs" is a function of the target acceleration "α". After the step S52 is executed, the following distance control routine ends.

On the other hand, when the result at the step S50 is negative (α24 0), it is determined that the braking control should not be executed. Step S54 sets the brake actuation value "Bs" at 0 (Bs=0), and does not perform the braking control to decelerate the vehicle. After the step S54 is executed, the following distance control routine ends.

When the result at the step S36 is negative ("CONT.FLG"="0" or "2"), step S56 is performed by the ECU 30. Step S56 detects whether any one of the accelerator pedal 16, the brake pedal and a shift lever of the vehicle has been manipulated by the vehicle operator. When the vehicle operator has manipulated any one of the accelerator pedal 16, the brake pedal and the shift lever, step S58 is performed by the ECU 30. Step S58 stops the braking control, sets the control flag "CONT.FLG" at 0 ("CONT.FLG"←0), and turns the main switch 36 OFF. After the step S58 is performed, the following distance control routine ends. When the vehicle operator has not manipulated any one of the accelerator pedal 16, the brake pedal and the shift lever, the step S58 is not performed and the following distance control routine ends.

In the above-described embodiment of the following distance control, the radar unit 40 and the step S10 correspond to the distance detecting device 51 (a distance detecting device in the claims), the steps S30–S34 and S48–54 correspond to the vehicle speed control device 52 (a vehicle speed control device in the claims), and the steps S36–S46 and S56–S58 correspond to the distance control start/stop determination device 53 (a distance control start/stop determination device in the claims). Further, the steps S36–S40 correspond to a stop condition detecting device in the claims, the step S42 corresponds to a braking control executing device in the claims, and the steps S56–S58 correspond to a braking control canceling device in the claims.

In the above-described embodiment, when it is determined that the braking control is being executed after the following distance control has been canceled, the execution of the braking control is kept on until the vehicle operator manipulates any one of the accelerator pedal, the brake pedal and the shift lever. Therefore, it is possible to prevent the vehicle from being abruptly accelerated due to the stop of the following distance control. Therefore, the distance control apparatus of the present embodiment does not give a sudden change in the behavior of the vehicle to the vehicle operator.

Figure 7A:
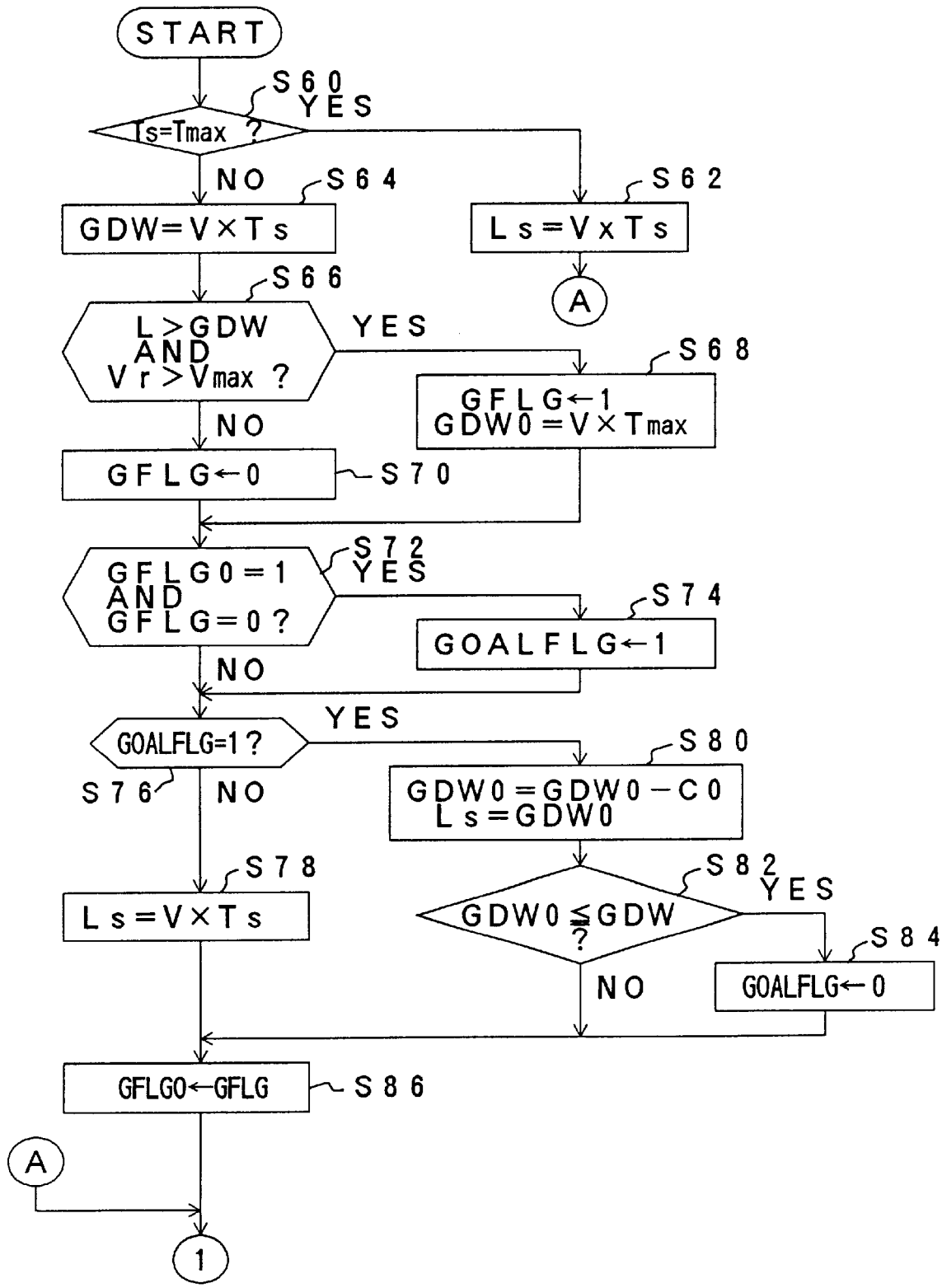
FIG. 7A and FIG. 7B are a flowchart for explaining a second embodiment of the following distance control routine executed in the automatic speed control procedure.
Figure 7B:
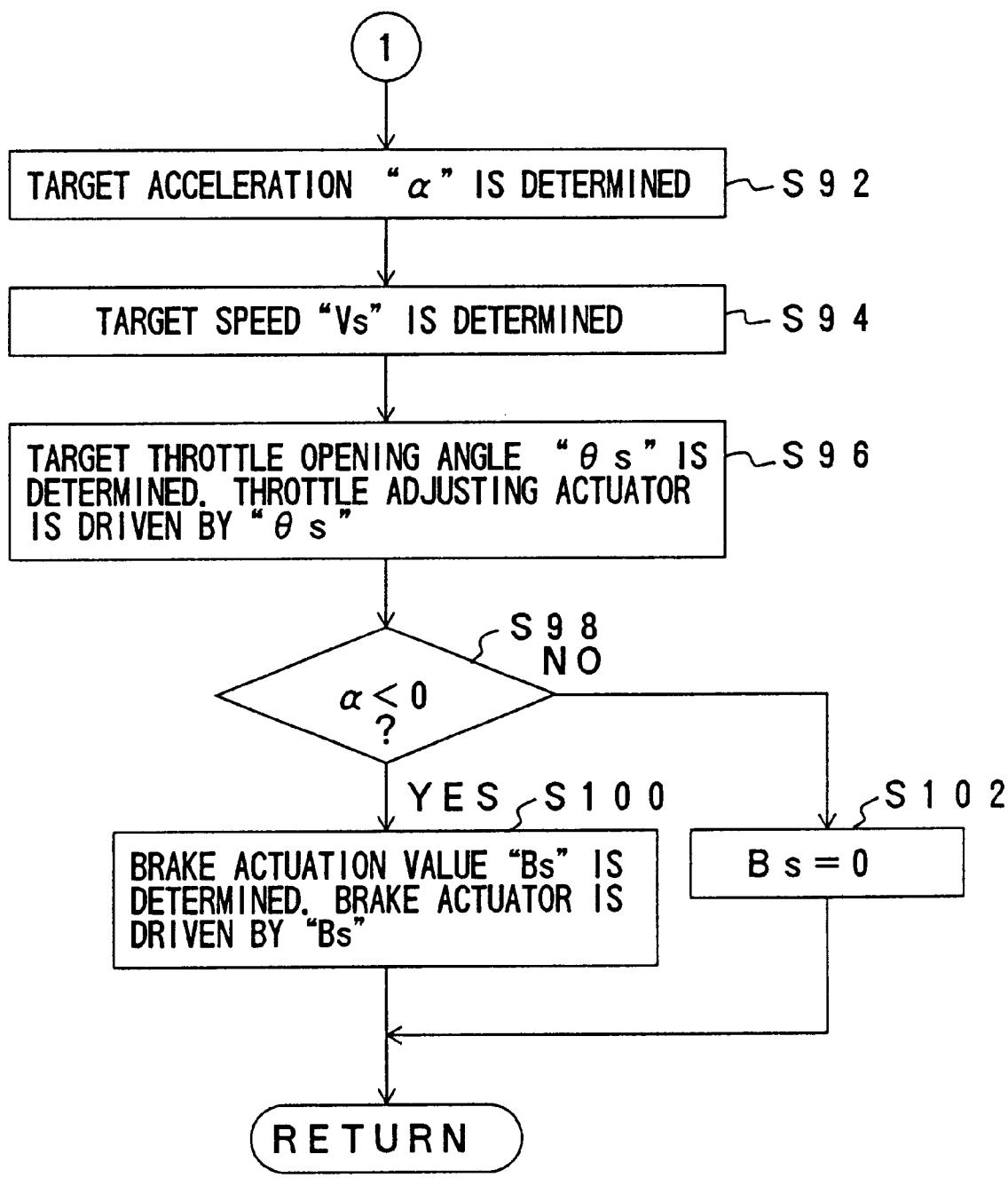

Next, FIG. 7A and FIG. 7B show a second embodiment of the following distance control routine executed in the automatic speed control procedure of FIG. 5. Similar to the embodiment of FIG. 6, the following distance control routine of FIG. 7A and FIG. 7B is executed by the ECU 30 at the step S28 shown in FIG. 5.

As shown in FIG. 7A, when the following distance control routine in this embodiment is started, the ECU 30 at step S60 detects whether a preset time "Ts" is equal to a maximum time "Tmax" (e.g. 3 seconds). In this embodiment, the preset time Ts is manually selected by the vehicle operator. If the maximum time Tmax is selected by the vehicle operator as the preset time Ts, the preset time Ts is considered as being fixed.

When Ts=Tmax, step S62 is executed by the ECU 30. Step S62 determines a first target distance "Ls" by multiplication of a detected vehicle speed "V" and the present time "Ts" (Ls=V·Ts). After the step S62 is performed, step S92 shown in FIG. 7B is executed by the ECU 30, which will be described later.

When Ts<Tmax, step S64 is executed by the ECU 30. Step S64 determines a second target distance "GDW" by multiplication of the detected vehicle speed "V" and the preset time "Ts" (GDW=V·Ts).

After the step S64 is performed, step S66 detects whether the detected following distance "L" from the radar unit 40 is greater than the second target distance "GDW" and whether the detected relative velocity "Vr" from the radar unit 40 is greater than a given maximum relative velocity "Vmax" (e.g. 20 km/h).

When the result at the step S66 is affirmative (L>GDW and Vr>Vmax), it is determined that the vehicle is abruptly approaching the preceding vehicle from a long distance. Step S68 sets an approach flag "GFLG" at 1 (GFLG←1), and determines a temporary target distance "GDW0" by multiplication of the detected vehicle speed "V" and the maximum time "Tmax" (GDW0=V·Tmax). The temporary target distance "GDW0" is set at the maximum value at the step S68.

When the result at the step S66 is negative (L≦GDW or Vr≦Vmax), it is determined that the vehicle is not abruptly approaching the preceding vehicle from a long distance. Step S70 sets the approach flag "GFLG" at 0 (GFLG←0).

After either the step S68 or the step S70 is performed, step S72 detects whether a previous approach flag "GFLG0" is equal to 1 and whether the approach flag "GFLG" is equal to 0. The step S72 is performed in order to make a determination as to whether the vehicle is previously determined as abruptly approaching the preceding vehicle from a long distance but it is currently determined as not abruptly approaching the preceding vehicle.

When the result at the step S72 is affirmative (GFLG0=1 and GFLG=0), step S74 sets an update flag "GOALFLG" at 1 (GOALFLG←1). When the update flag "GOALFLG" is set at 1, it indicates that the first target distance "Ls" is updated and gradually decreasing.

When the result at the step S72 is negative (GFLG0=0 or GFLG=1), step S76 detects whether the update flag "GOAL-FLG" is equal to 1.

When the update flag "GOALFLG" is not equal to 1, step S78 determines the first target distance "Ls" by multiplication of the detected vehicle speed "V" and the preset time "Ts" (Ls=V·Ts). At the step S78, the first target distance "Ls" is set to the value (=V·Ts) that is selected by the vehicle operator and it is no longer updated.

When the result at the step S76 is affirmative (GOALFLG=1), step S80 is executed by the ECU 30. Step S80 updates the temporary target distance "GDW0" by subtracting a given value "Co" (e.g. 1 m) from the temporary target distance "GDW0" (GDW0=GDW0−Co), and sets the first target distance "Ls" at the resulting temporary target distance "GDW0" (Ls=GDW0).

After the step S80 is performed, step S82 detects whether the updated temporary target distance "GDW0" (obtained at the step S80) is below the second target distance "GDW" (obtained at the step S64). When GDW0≧GDW, step S84 is executed by the ECU 30. Step S84 sets the update flag "GOALFLG" at 0 (GOALFLG=0). When GDW0>GDW, step S86 is executed, which will be described later.

After either the step S78 or the step S84 is performed, or when the result at the step S82 is negative, step S86 is executed by the ECU 30. Step S86 sets the previous approach flag "GFLG0" at the value of the approach flag "GFLG" (GFLG0←GFLG). After the step S86 is performed, step S92 shown in FIG. 7B is executed by the ECU 30.

In the present embodiment, when it is determined that a difference in speed between the vehicle and the preceding vehicle is greater than the maximum relative velocity and the vehicle abruptly approaches the preceding vehicle from a long distance, the first target distance "Ls" is set at the maximum value (=V·Tmax). When the detected following distance "L" decreases to a distance smaller than the first target distance "Ls", the first target distance "Ls" is updated and gradually decreased, and it is finally set to the value (=V·Ts) that is selected by the vehicle operator. The distance control apparatus of the present embodiment determines that the following distance control should be executed, when the following distance is detected to be smaller than the updated target distance.

Accordingly, in the distance control apparatus of the present embodiment, the first target distance "Ls" is either set at the maximum value or gradually decreased from the maximum value in response to an operating condition of the vehicle, and the following distance control is executed or canceled in accordance with the updated first target distance "Ls". It is possible for the distance control apparatus of the present embodiment to effectively prevent the operating condition of the vehicle from being abruptly shifted or changed due to the restart of the following distance control when the vehicle abruptly approaches the preceding vehicle from a long distance.

As shown in FIG. 7B, step S92 determines a target acceleration "α" with respect to the vehicle. The target acceleration "α" is determined from the distance difference Dl and the relative velocity Vr by utilizing the two-dimensional map in which the target acceleration "α" is defined as a function using the parameters Dl and Vr. The distance difference Dl is determined by subtracting the updated first target distance "Ls" from the detected following distance L from the radar unit 40 (or Dl=L−Ls). The relative velocity Vr is detected based on the speed signal from the radar unit 40. In the two-dimensional map, the target acceleration "α" is equal to zero when Dl=0 and Vr=0. When the parameter Vr is fixed at a constant value, the greater the distance difference Dl is, the greater the target acceleration α is. When the parameter Dl is fixed at a constant value, the greater the relative velocity Vr is, the greater the target acceleration α is.

After the step S92 is performed, step S94 determines a target speed "Vs" with respect to the vehicle. The target speed "Vs" is determined by taking the integral of the target acceleration "α".

After the step S94 is performed, step S96 determines a target throttle opening angle $\theta_s$ in accordance with the following equation:

$$\theta_s = K1 \cdot Vs + K2 \cdot (Vr - V)$$

where K1 and K2 are predetermined coefficients, Vs is the updated first target speed, Vr is the relative velocity from the radar unit 40, and V is the detected vehicle speed from the vehicle speed sensor 32.

Further, step S94 drives the throttle adjusting actuator 18 such that the throttle opening angle of the throttle valve 12 is adjusted to the target throttle opening angls $\theta_s$ by the throttle adjusting actuator 18.

After the step S96 is performed, step S98 detects whether the target acceleration "α" is smaller than 0. The step S50 is performed in order to make a determination as to whether the braking control should be executed to decelerate the vehicle.

When the result at the step S98 is affirmative (α<0), it is determined that the braking control should be executed to decelerate the vehicle. Step S100 determines a brake actuation value "Bs" from the target acceleration "α", and drives the brake actuator 42 such that the braking force according to the brake actuation value "Bs" is exerted on the vehicle wheels by the brake actuator 42. The brake actuation value "Bs" is a function of the target acceleration "α". After the step S100 is executed, the following distance control routine in this embodiment ends.

On the other hand, when the result at the step S98 is negative (α≧0), it is determined that the braking control should not be executed. Step S102 sets the brake actuation value "Bs" at 0 (Bs=0), and does not perform the braking control to decelerate the vehicle. After the step S102 is executed, the following distance control routine in this embodiment ends.

In the above-described second embodiment of the following distance control, the radar unit 40 and the step S10 correspond to the distance detecting device 51 (the distance detecting device in the claims), the steps S92–S102 correspond to the vehicle speed control device 52 (the vehicle speed control device in the claims), and the steps S60–S86 correspond to the distance control start/stop determination device 53 (the distance control start/stop determination device in the claims). Further, the steps S66, S72, S76 and S82 correspond to an approach condition detecting device in the claims, and the steps S64, S68, S78, S80 and S84 correspond to a target distance adjusting device in the claims.

In the above-described second embodiment, the first target distance "Ls" is gradually decreased from the maximum value in response to the operating condition of the vehicle, and the following distance control is started in accordance with the updated first target distance "Ls". It is possible for the distance control apparatus of the present embodiment to prevent the operating condition of the vehicle from being abruptly shifted or changed due to the start of the following distance control when the vehicle abruptly approaches the preceding vehicle from a long distance. Therefore, the distance control apparatus of the present embodiment does not give a sudden change in the behavior of the vehicle to the vehicle operator.

In the above-described first and second embodiments, the performance of the radar unit 40 may be degraded in rainy or foggy weather, and the detection of the following distance by the radar unit 40 may become inaccurate. Therefore, in rainy or foggy condition, the following distance control should be canceled. For this purpose, it is preferred to add to the following distance control routine of the above-described embodiments a step of detecting whether the vehicle is operating in rainy or foggy condition.

Further, the present invention is not limited to the above-described embodiments, and variations and modifications may be made without departing from the scope of the present invention.

What is claimed is:

1. A distance control apparatus for an automotive vehicle, comprising:

a distance detecting device for detecting a distance between the vehicle and a preceding vehicle;

a vehicle speed control device for controlling the distance between the vehicle and the preceding vehicle by adjusting a speed of the vehicle based on the detected distance, in order to keep the vehicle away from the preceding vehicle at a target distance; and a distance control start/stop determination device for determining one of execution and cancellation of the control of the distance by the vehicle speed control device in response to an operating condition of the vehicle, and comprising:

an approach condition detecting device for detecting an approach condition in which the vehicle approaches the preceding vehicle; and a target distance adjusting device for adjusting the target distance in response to the approach condition detected by the approach condition detecting device.

2. A distance control apparatus for an automotive vehicle, comprising:

a distance detecting device for detecting a distance between the vehicle and a preceding vehicle;

a vehicle speed control device for controlling the distance between the vehicle and the preceding vehicle by adjusting a speed of the vehicle based on the detected distance, in order to keep the vehicle away from the preceding vehicle at a target distance; and a distance control start/stop determination device for determining one of execution and cancellation of the control of the distance by the vehicle speed control device in response to an operating condition of the vehicle, and comprising:

a stop condition detecting device for detecting that the control of the distance by the vehicle speed control device has been canceled, from the operating condition of the vehicle;

a braking control executing device for continuing to execute a braking control to decelerate the vehicle when said stop condition detecting device has detected that the control of the distance is stopped; and a braking control canceling device for canceling the braking control by the braking control executing device when a manipulation of a vehicle operator is detected.

3. The distance control apparatus according to claim 2, wherein said distance detecting device comprises:

a radar unit for outputting a signal indicating the distance between the vehicle and the preceding vehicle; and a reading device for reading the signal output from the radar unit to detect the distance based on the signal.

4. The distance control apparatus according to claim 1, wherein said vehicle speed control device comprises:

an acceleration detecting device for detecting that an acceleration of the vehicle is smaller than zero; and a brake actuator drive device for driving a brake actuator in accordance with a brake actuation value so as to decelerate the vehicle when said acceleration detecting device has detected that the acceleration of the vehicle is smaller than zero.

5. The distance control apparatus according to claim 1, wherein said vehicle speed control device comprises:

a target speed determining device for determining a target speed of the vehicle from an acceleration of the vehicle; and a throttle adjusting actuator drive device for driving a throttle adjusting actuator in accordance with a target throttle opening angle so as to adjust the speed of the vehicle, said target throttle opening angle being determined based on the target speed from the target speed determining device.

6. The distance control apparatus according to claim 1, wherein said approach condition detecting device makes a determination as to whether the detected distance is greater than a derived target distance and a detected relative velocity is greater than a given maximum relative velocity, said derived target distance being determined by multiplication of a detected vehicle speed and a preset time.

7. The distance control apparatus according to claim 2, wherein said stop condition detecting device makes a determination as to whether execution of the control of the distance by the vehicle speed control device has been determined at a previous cycle.

8. The distance control apparatus according to claim 2, wherein said stop condition detecting device detects whether a detected vehicle speed is lower than a given reference speed, in order to make a determination as to whether the control of the distance by the vehicle speed control device should continue to be executed.

9. The distance control apparatus according to claim 2, wherein said stop condition detecting device detects whether an acceleration of the vehicle is smaller than zero, in order to make a determination as to whether the braking control by the braking control executing device should continue to be executed.

10. The distance control apparatus according to claim 2, wherein said distance detecting device comprises:

a radar unit for outputting a signal indicating the distance between the vehicle and the preceding vehicle; and a reading device for reading the signal output from the radar unit to detect the distance based on the signal.

11. The distance control apparatus according to claim 2, wherein said vehicle speed control device comprises:

an acceleration detecting device for detecting that an acceleration of the vehicle is smaller than zero; and a brake actuator drive device for driving a brake actuator in accordance with a brake actuation value so as to decelerate the vehicle when said acceleration of the vehicle is smaller than zero.

12. The distance control apparatus according to claim 2, wherein said vehicle speed control device comprises:

a target speed determining device for determining a target speed of the vehicle from an acceleration of the vehicle; and a throttle adjusting actuator drive device for driving a throttle adjusting actuator in accordance with a target throttle opening angle so as to adjust the speed of the vehicle, said target throttle opening angle being determined based on the target speed from the target speed determining device.

* * * * *